(12) United States Patent  
Cheng

(10) Patent No.: US 8,170,613 B2  
(45) Date of Patent: May 1, 2012

(54) ELECTRONIC APPARATUS WITH SIM CARD AND PHONE DIRECTORY MANAGEMENT METHOD THEREOF

(75) Inventor: Ann-Tzung Cheng, Taipei (TW)

(73) Assignee: ASUSTeK Computer Inc., Taipei (TW)

( * ) Notice: Subject to any disclaimer, the term of this patent is extended or adjusted under 35 U.S.C. 154(b) by 845 days.

(21) Appl. No.: 11/530,906

(22) Filed: Sep. 12, 2006

(65) Prior Publication Data

US 2007/0060199 A1      Mar. 15, 2007

(30) Foreign Application Priority Data

Sep. 14, 2005   (TW) .............................. 94131600 A

(51) Int. Cl.
*H04B 1/38* (2006.01)
(52) U.S. Cl. ...................................................... 455/558
(58) Field of Classification Search ................. None
See application file for complete search history.

(56) References Cited

U.S. PATENT DOCUMENTS

| | | | | |
|---|---|---|---|---|
| 5,923,327 A * | 7/1999 | Smith et al. | .................... | 715/784 |
| 6,002,929 A * | 12/1999 | Bishop et al. | ................. | 455/431 |
| 6,016,497 A * | 1/2000 | Suver | .................................. | 1/1 |
| 6,052,604 A * | 4/2000 | Bishop et al. | .................. | 455/558 |
| 6,185,295 B1 * | 2/2001 | Frederiksen et al. | .... | 379/355.05 |
| 6,370,374 B1 * | 4/2002 | Eichinger et al. | ............. | 455/411 |
| 6,411,822 B1 * | 6/2002 | Kraft | ............................. | 455/558 |
| 6,484,039 B1 * | 11/2002 | Volland et al. | ................ | 455/558 |
| 6,501,962 B1 * | 12/2002 | Green | ........................... | 455/558 |
| 6,694,152 B1 * | 2/2004 | Helle | ............................ | 455/558 |
| 6,754,323 B1 * | 6/2004 | Chang et al. | ............ | 379/205.01 |
| 7,551,899 B1 * | 6/2009 | Nicolas et al. | .................. | 455/73 |
| 2004/0253988 A1 * | 12/2004 | Goldman | ...................... | 455/564 |

* cited by examiner

*Primary Examiner* — Yuwen Pan
*Assistant Examiner* — Ayodeji Ayotunde
(74) *Attorney, Agent, or Firm* — Jianq Chyun IP Office

(57) ABSTRACT

An electronic apparatus with a subscriber identity module (SIM) card and the phone directory management method thereof are provided. The electronic apparatus allows the user to store a group of phone numbers which belong to the same contact name in the SIM card using specially designed identity codes.

17 Claims, 4 Drawing Sheets

301

| |
|---|
| Alan,0917834564 |
| Bob,0726627334 |
| John,0755678790 |
| John,0228991444 |
| John,0932879872 |

302

| |
|---|
| Name: John |
| Phone number 1: 0755678790 |
| Phone number 2: 0228991444 |
| Phone number 3: 0932879872 |
| |

303

| |
|---|
| Alan@M,0917834564 |
| Bob@M,0726627334 |
| John@H,0755678790 |
| John@O,0228991444 |
| John@M,0932879872 |

304

| |
|---|
| Name: John |
| Home phone number: 0755678790 |
| Office phone number: 0228991444 |
| Mobile phone number: 0932879872 |
| |

FIG. 3

ELECTRONIC APPARATUS WITH SIM CARD AND PHONE DIRECTORY MANAGEMENT METHOD THEREOF

CROSS-REFERENCE TO RELATED APPLICATION

This application claims the priority benefit of Taiwan application serial no. 94131600, filed Sep. 14, 2005. All disclosure of the Taiwan application is incorporated herein by reference.

BACKGROUND OF THE INVENTION

1. Field of Invention

The present invention relates to an electronic apparatus with a subscriber identity module (SIM) card. More particularly, the present invention relates to an electronic apparatus with a SIM card and a phone directory management method thereof.

2. Description of Related Art

In the conventional subscriber identity module (SIM) card phone directory, only one contact name and one phone number are provided for each contact entry; when the user enters or updates the contact entry in the SIM card, only one phone number can be recorded for one contact. If multiple phone numbers are to be recorded for the same contact, usually the user has to add in multiple contact entries to store each of the phone numbers. For example, the user has to record different contact names for the same contact, such as Tony, and Tony-1. This phone directory management method is time-consuming and is hard to maintain.

An existing solution is to store the phone numbers of the contact in the mobile phone or mobile apparatus, such that the mobile phone provides the record function for recording the contacts and the search function for searching the contacts. However, in this way, multiple phone numbers of the same contact can only be stored in the memory of the mobile phone instead of the SIM card. Once the mobile phone is replaced, the data cannot be transferred into the new mobile phone along with the SIM card but must be entered into the new mobile phone again, which is very inconvenient.

Nowadays, people usually have a group of phone numbers, and replace mobile phones quickly, so the conventional SIM card cannot meet the requirement of recording multiple phone numbers under the same contact, and the electronic apparatuses with conventional SIM card do not provide any relative function of storing multiple phone numbers for one contact entry either.

SUMMARY OF THE INVENTION

Accordingly, the present invention is directed to provide an electronic apparatus with a subscriber identity module (SIM) card, which can solve the inability of storing multiple phone numbers under the same contact and store the data into the SIM card.

According to another aspect of the present invention, a phone directory management method for an electronic apparatus with a SIM card is provided, which allows the user to record multiple phone numbers under the same contact entry and stores the data into the SIM card.

To accomplish the aforementioned and other objectives, the present invention provides an electronic apparatus with a SIM card, which includes a phone directory input unit, a SIM card connector, a control unit, a memory, a record comparison and process unit, and a phone directory display module. The phone directory input unit allows the user to input at least one group of contact data and the phone directory input unit provides at least one name field and multiple phone number fields for entering the name of the contact in the name field and the corresponding multiple phone numbers in multiple phone number fields. The SIM card connector is electrically connected to the SIM card. When the name and phone numbers of a contact are input by the user, the contact's name is stored in the SIM card as a name record, and the phone numbers thereof are stored in the SIM card as multiple phone number records, and each of the multiple phone number records and the corresponding name record constitute a plurality of SIM card records. The control unit is electrically connected to the SIM card connector. The memory is controlled by a first command of the control unit to store these SIM card records into the memory. The record comparison and process unit compares, processes, and arranges the SIM card records stored in the memory. The phone directory display module displays the name record and all the phone number records under the same contact name as the name displayed on the screen.

According to the electronic apparatus with a SIM card in an embodiment, the multiple SIM card records further include at least one first identity code which is affixed in different alphabets to the name record based on the input phone number field. The first identity code includes home phone number identity code, office phone number identity code, and mobile phone number identity code.

According to the electronic apparatus with a SIM card in an embodiment, the phone number fields further include home phone number field, office phone number field, and mobile phone number field.

According to the electronic apparatus with a SIM card in an embodiment, the SIM records further include a second identity code which is a fixed special symbol located between the name record and the first identity code to separate the contact name and the first identity code. Wherein, the first identity code and the second identity code are not displayed on the screen.

According to the electronic apparatus with a SIM card an embodiment, the record comparison and process unit searches for all the phone number records having the same contact name as the name record based on the contact data stored in the memory, the first identity code, and the second identity code, and displays the name record and all the phone numbers having the same contact name as the name displayed on the screen.

According to another aspect, the present invention further provides a phone directory management method for an electronic apparatus with a SIM card, the steps thereof including: first, inputting the name and multiple phone numbers of the contact using the phone directory input unit; then, displaying the name and phone numbers based on the user's requirement; next, saving the name and phone numbers in a SIM card, while generating and saving the corresponding first identity code and second identity code in the SIM card. The contact name is stored in the SIM card as a name record, the phone numbers of the contact are stored in the SIM card as multiple phone number records, and each of the phone number records and the corresponding name records constitute multiple SIM card records. The SIM card records are obtained and stored in the memory when the user needs to browse the data in the phone directory. Then, the SIM card records are compared and processed, and the name and all the phone numbers corresponding to the contact are displayed on the screen.

According to the present invention, with the design of identity codes, different types of identity codes are affixed to the name record in the SIM, the corresponding phone number records are displayed through the record comparison and process unit and the phone directory display module. Accordingly, the problem of the conventional SIM card that only one phone number could be recorded under one contact name is resolved.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 3 is a diagram illustrating two encoding manners and a display manner of an electronic apparatus with a SIM card according to an embodiment of the present invention.

DESCRIPTION OF EMBODIMENTS

Figure 1:
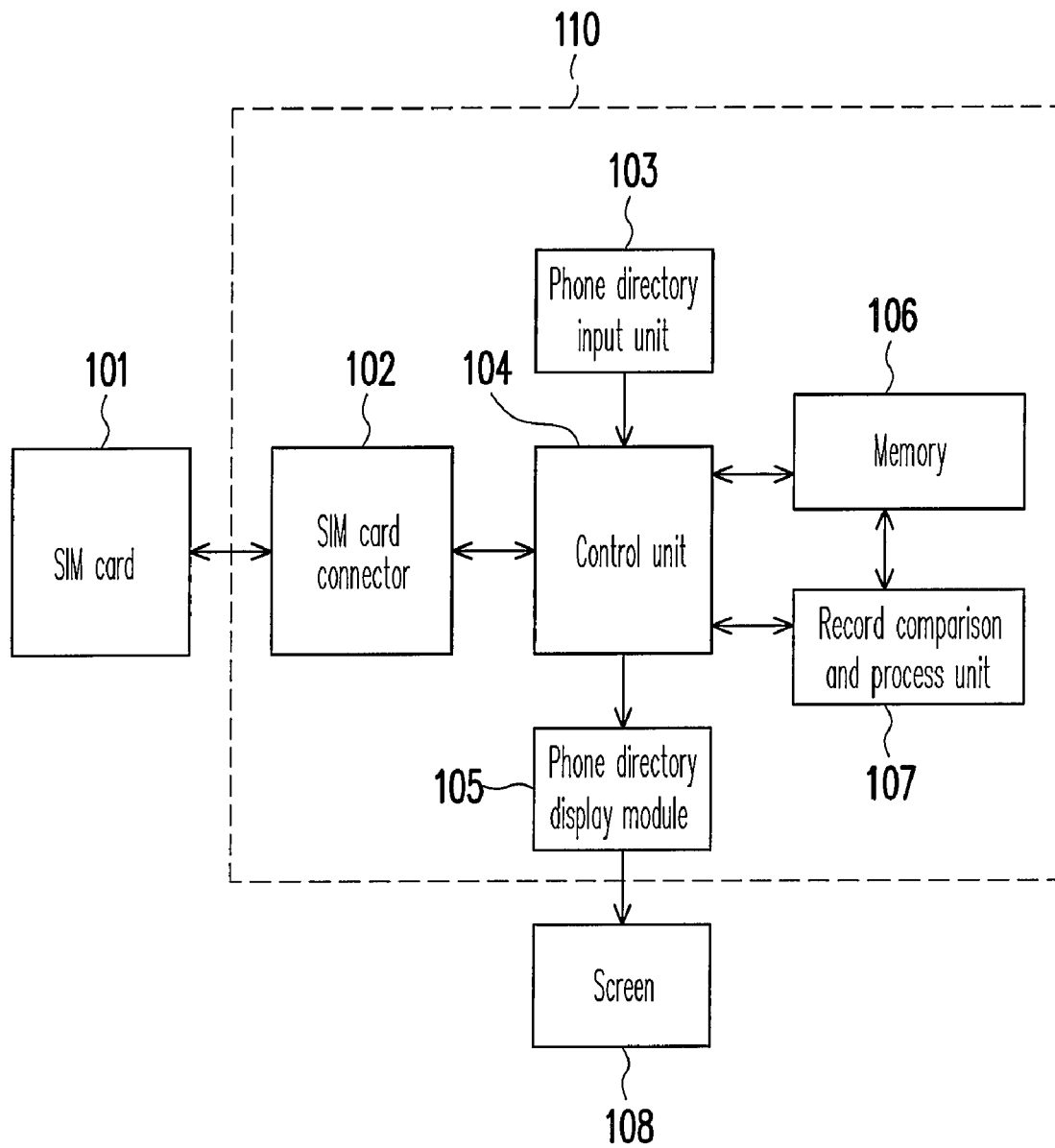
FIG. 1 is a block diagram of an electronic apparatus with a SIM card according to an embodiment of the present invention.

Referring to FIG. 1, which is a block diagram of an electronic apparatus with a SIM card according to an embodiment of the present invention. In the present embodiment, FIG. 1 includes an electronic apparatus 110 using a SIM card (herein referred to as electronic apparatus 110), a SIM card 101, and a screen 108. In the present embodiment, the electronic apparatus 110 includes a SIM card connector 102, a phone directory input unit 103, a control unit 104, a phone directory display module 105, a memory 106, and a record comparison and process unit 107. The SIM card connector 102 is electrically connected to the SIM card 101 and the control unit 104. The phone directory input unit 103 may be implemented by hardware module or software module. In this embodiment, the phone directory input unit 103 is the user interface (UI) which provides a name field and a plurality of phone number fields so that the user can input contact data through those fields of the UI. That is, the user can enter the contact name in the name field, and a plurality of contact phone numbers in the phone number fields. When the user enters the data of the contact, the control unit 104 stores a name record and multiple phone number records in the SIM card 101 through the SIM card connector 102. In the SIM card 101, the corresponding name record and multiple phone number records constitute multiple SIM card records. The memory 106 is controlled by a first command output by the control unit 104 to store the SIM card records in the SIM card 101 into the memory 106.

The record comparison and process unit 107 may be implemented by hardware module or software module. In this embodiment, The record comparison and process unit 107 compares, processes, and arranges the SIM card records stored in the memory 106, and the phone directory display module 105 displays the name record and the corresponding phone numbers having the same contact name as the name record on the screen 108 based on the result of comparison. In this embodiment, the phone directory display module 105 may be implemented by software, such as a display application program.

In the present embodiment, the SIM card 101 may be a global system for mobile communication (GSM) SIM card, a universal subscriber identity module (USIM) SIM card, or other mobile communication system SIM cards.

In the present embodiment, the phone number fields provided by the phone directory input unit 103 includes different type of phone number fields, such as a home phone number field, an office phone number field, and a mobile phone number field.

In the present embodiment, the SIM card records stored in the SIM card 101 include two types of identity codes: the first identity code and the second identity code. The first identity code is affixed to the name record in different alphabets based on the input phone number field which is filled with phone number. For example, H, O, and M represents home phone number identity code, office phone number identity code, and mobile phone number identity code, respectively. Therefore, the record comparison and process unit 107 determines the type of phone number according to the first identity code. In addition, the second identity code is located between the first identity code and the name record for separating the contact name and the first identity code. The second identity code may be formed by a special symbol, e.g. !, @, % . . . etc. It should be noted that the SIM card records are not limited to patterns such as % M, % O, % H . . . etc; instead, it is acceptable as long as the record comparison and process unit 107 can distinguish the name record, the first identity code, and the second identity code.

In the present embodiment, the record comparison and process unit 107 compares and processes the SIM card records stored in the memory 106 based on the first identity code and second identity code, and the phone directory display module 105 only displays the name record and the phone number records in the comparison result but not the first identity code and the second identity code thereof on the screen 108.

Figure 2A:
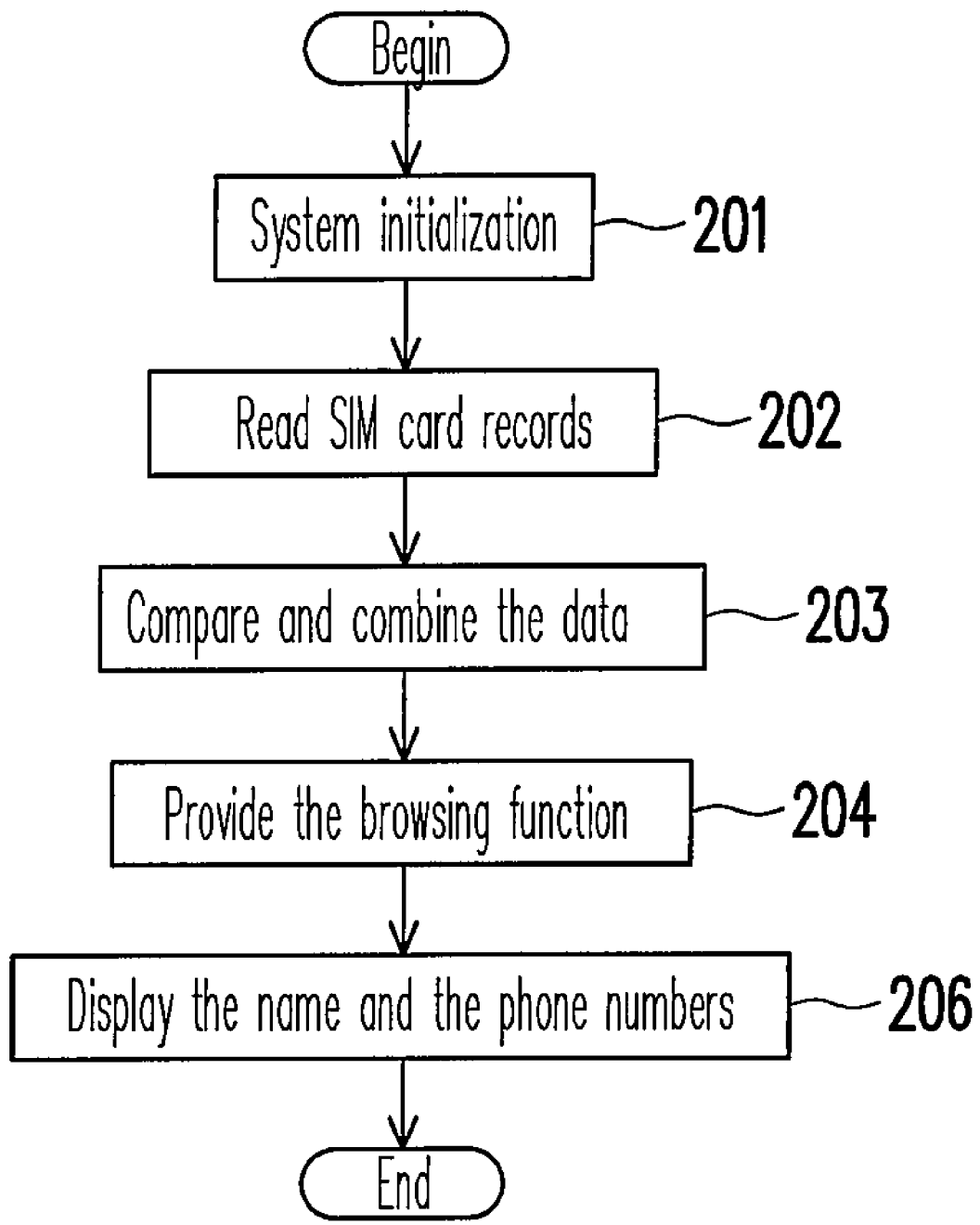
FIG. 2A is a flowchart of browsing a phone directory in the phone directory management method for an electronic apparatus with a SIM card according to an embodiment of the present invention.

FIG. 2A is a flowchart of browsing a phone directory in the phone directory management method for an electronic apparatus with a SIM card according to an embodiment of the present invention.

Please refer to FIG. 1 and FIG. 2A to depict the phone directory management method. In the step 201, the system is initialized. That is, the initialization operation required after the mobile phone is turned on and before the data in the SIM card is read. In the step 201, the control unit 104 reads all the SIM card records including name records and phone number records of the contacts from the SIM card 101 through the SIM card connector 102 and stores the SIM card records into the memory 106. In the step 203, the record comparison and process unit 107 compares the data obtained in the step 202 and combines the data. In other words, the record comparison and process unit 107 determines the types of the phone numbers based on the first identity code, and separates the name record of the contact and the first identity code by the second identity code. Therefore, the record comparison and process unit 107 can searches all the SIM card records stored in the memory 106 and compares the SIM card records whether have the same contact name. If there is the same contact name, the record comparison and process unit 107 combines the contact and corresponding phone numbers. In the step 204, the phone directory display module provides the browsing function to the user. In the step 206, the contact name and the at least one corresponding phone number thereof are displayed for the user for browsing through the screen 108, but the first identity code and the second identity code in the SIM card records are not displayed. For example, the screen 108 may display one contact name and two corresponding phone numbers thereof, or display one contact name and one corresponding phone number thereof.

Figure 2B:
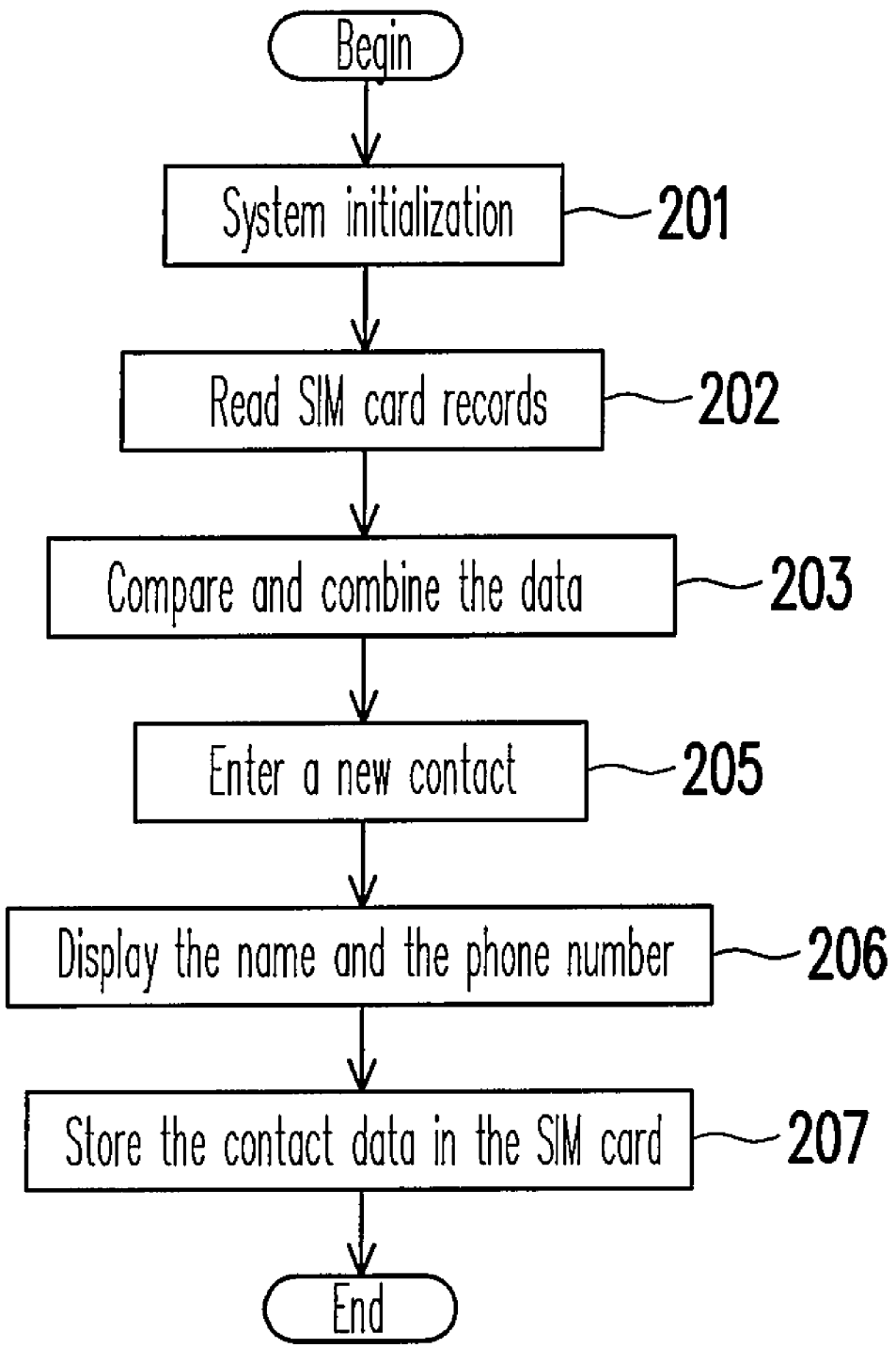
FIG. 2B is a flowchart of adding a new contact entry in the phone directory management method for an electronic apparatus with a SIM card according to an embodiment of the present invention.

FIG. 2B is a flowchart of adding a new contact entry in the phone directory management method for an electronic apparatus with a SIM card according to an embodiment of the present invention. According to the description of the FIG. 2B, please refer to FIG. 1 and FIG. 2A. Since the steps 201 to 203 are the same as those in FIG. 2A, the descriptions corresponding to steps 201 to 203 are not described again. In the step 205, the phone directory input unit 103 provides the name field and multiple phone number fields for the user to enter the name and the phone numbers of the new contact. The phone number fields include multiple fields, such as a home phone number field, an office phone number field, and a mobile phone number field. In the step 206, the screen 108 displays the name and at least one phone number input by the user through the phone directory input unit 103. In the step 207, the control unit 104 stores the contact name data and the phone numbers data added by the user in the SIM card 101, such that the contact name is stored as a name record in the SIM card 101, and the phone numbers are stored as multiple phone number records in the SIM card 101. In addition, the name record and each of the corresponding phone number records constitute multiple SIM card records.

The SIM card records have two kinds of codes stored in the SIM card 101. FIG. 3 is a diagram illustrating two encoding patterns and the display pattern of an electronic apparatus with a SIM card according to an embodiment of the present invention. As shown in FIG. 3, the table 301 is the first encoding storage pattern which uses the contact name as the name record in the SIM card directly. Thus, if the contact has 3 phone numbers, then there will be 3 phone number records under the same name record in the SIM card 101. For example, there are three different phone numbers under the same contact name John as shown in the table 301. With John in the table 301 as an example, the display pattern is as the table 302: there are three different phone numbers under John, which are specified respectively as phone number 1, phone number 2, phone number 3, and so on.

On the other hand, the table 303 shown in FIG. 3 is the second kind of encoding storage pattern which will generate the corresponding first identity code for the SIM card record based on the phone number field, wherein when the phone number is entered, the first identity code is affixed to the name record but is not displayed. The first identity code is represented by different alphabets according to the input phone number field. For example H, O, and M affixed to the name record represents home phone number identity code, office phone number identity code, and mobile phone number identity code, respectively. In addition, a second identity code is generated between the name record of the SIM card records and the first identity for distinguishing the contact name and the first identity code. The second identity code may be formed by a special symbol, e.g. !, @, % etc. That is, the composition of identity code is not limited to the pattern of @M, @O, @H etc; instead, it is acceptable as long as the record comparison and process unit 107 can distinguish the name and the identity code. The first identity code and the second identity code are not displayed, and the name record and the phone number records constitute the SIM card records in the SIM card, as the table 303 shown in FIG. 3.

Using John in the table 303 of FIG. 3 as an example, the display pattern is as the table 304: there are three different types of phone numbers under John, home phone number, office phone number, and mobile phone number, respectively; the name record and the first identity code are distinguished based on the second identity code (special symbol @ in the present embodiment) in between. And the first identity code (in the present embodiment, H represents home phone number, O represents office phone number, and M represents mobile phone number) is used for distinguishing the type of the phone number.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An electronic apparatus with a Subscriber Identity Module (SIM) card, the apparatus comprising:
   a phone directory input unit, for entering at least one group of contact data, and providing at least one name field and a plurality of phone number fields for entering a contact name in the name field and a plurality of contact phone numbers in the phone number fields;
   a control unit;
   a SIM card connector electrically connected to the control unit and the SIM card, respectively, wherein the control unit stores the contact data in the SIM card through the SIM card connector, such that the contact name of the contact data forms a name record in the SIM card and the contact phone numbers form a plurality of phone number records in the SIM card, and each of the phone number records and the corresponding name record form a plurality of SIM card records stored in the SIM card, wherein the SIM card records further include a first identity code affixed to the name record according to the phone number field where the phone number is entered, and the first identity code is stored in the SIM card to indicate the type of the phone numbers;
   a memory, electrically connected to the control unit for receiving a first command from the control unit to store the SIM card records in the memory;
   a record comparison and process unit, for comparing, processing, and arranging the SIM card records stored in the memory; and
   a phone directory display module, for displaying the name record and all the phone number records under the same contact name as the name record on a screen, wherein the first identity code is not displayed on the screen.

2. The electronic apparatus as claimed in claim 1, wherein the record comparison and process unit searches for all the SIM card records having the same contact name as the name record and displays the name record and all the phone number records corresponding to the name record on the screen.

3. The electronic apparatus as claimed in claim 1, wherein the phone number fields further include a home phone number field, an office phone number field, and a mobile phone number field.

4. The electronic apparatus as claimed in claim 1, wherein the first identity code further includes one of a home phone number identity code, an office phone number identity code, and a mobile phone number identity code.

5. The electronic apparatus as claimed in claim 1, further including a second identity code located between the name record and the first identity code to separate the contact name and the first identity code.

6. The electronic apparatus as claimed in claim 5, wherein the second identity code is a fixed special symbol, the first identity code is one of a plurality of alphabets, and the first identity code has different alphabet based on the input phone number field.

7. The electronic apparatus as claimed in claim 5, wherein the first identity code and the second identity code are not displayed on the screen.

8. A phone directory management method for an electronic apparatus with a Subscriber Identity Module (SIM) card, including:
(a) entering a name and a plurality of phone numbers of a contact through a phone directory input unit;
(b) storing the name and the phone numbers of the contact into the SIM card, wherein the contact name is stored as a name record in the SIM card, the phone numbers are stored as a plurality of phone number records in the SIM card, and each of the phone number records and the corresponding name record form a plurality of SIM card records stored in the SIM card, wherein the SIM card records further include at least one first identity code affixed to the name record according to the phone number field where the phone number is entered, and the first identity code is stored in the SIM card to indicate the type of the phone numbers;
(c) obtaining and storing the SIM card records in a memory; and
(d) comparing and processing the SIM card records, and displaying the name and the corresponding phone numbers of the contact on a screen, further comparing and processing the name record and the phone number records using the first identity code, without displaying the first identity code on the screen.

9. The phone directory management method as claimed in claim 8, wherein step (c) further includes searching for all the phone number records having the same contact name as the name record in the SIM card records.

10. The phone directory management method as claimed in claim 8, wherein step (a) further includes providing a name field and a plurality of phone number fields for entering the name in the name field and the phone numbers in the phone number fields.

11. The phone directory management method as claimed in claim 10, wherein the phone number fields further include a home phone number field, an office phone number field, and a mobile phone number field.

12. The phone directory management method as claimed in claim 8, wherein the first identity code further includes one of a home phone number identity code, an office phone number identity code, and a mobile phone number identity code.

13. The phone directory management method as claimed in claim 8, wherein each of the SIM card records further includes a second identity code located between the name record and the first identity code to separate the name and the first identity code.

14. The phone directory management method as claimed in claim 13, wherein the second identity code is a fixed special symbol, the first identity code is one of a plurality of alphabets, and the first identity code is a different alphabet based on the input phone number field.

15. The phone directory management method as claimed in claim 13, further including comparing, processing, and displaying the phone number records using the first identity code and the second identity code, without displaying the first identity code and the second identity code.

16. The electronic apparatus as claimed in claim 1, further including a phone label corresponding to the first identity code and displayed on the screen.

17. The phone directory management method as claimed in claim 8, further including displaying a phone label corresponding to the first identity code on the screen.

* * * * *